United States Patent
Nigudkar et al.

(10) Patent No.: US 12,506,601 B2
(45) Date of Patent: Dec. 23, 2025

(54) SYSTEM AND METHOD FOR MITIGATING DUAL DOMAIN VULNERABILITIES USING FIBER OPTIC GYROSCOPE AND QUANTUM CRYPTOGRAPHY

(71) Applicant: BANK OF AMERICA CORPORATION, Charlotte, NC (US)

(72) Inventors: Avinash Basavant Nigudkar, Maharashtra (IN); Rinki Bhatia, Haryana (IN); Amit Dilip Champanerkar, Maharashtra (IN); Rajendra U. Pradhan, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 51 days.

(21) Appl. No.: 18/655,961

(22) Filed: May 6, 2024

(65) Prior Publication Data

US 2025/0343682 A1    Nov. 6, 2025

(51) Int. Cl.
*H04L 9/08* (2006.01)
*G06F 21/55* (2013.01)
*H04B 10/70* (2013.01)

(52) U.S. Cl.
CPC .......... *H04L 9/0852* (2013.01); *G06F 21/554* (2013.01); *G06F 2221/034* (2013.01); *H04B 10/70* (2013.01)

(58) Field of Classification Search
CPC . H04L 9/0852; G06F 21/54; G06F 2221/034; H04B 10/70
USPC ........................................................ 713/171
See application file for complete search history.

(56) References Cited

U.S. PATENT DOCUMENTS

| | | | |
|---|---|---|---|
| 11,949,463 B1* | 4/2024 | Septon | H04B 10/70 |
| 11,990,943 B2* | 5/2024 | Rahman | H04L 63/1408 |
| 12,206,702 B2* | 1/2025 | Routt | H04L 63/1441 |
| 2023/0361883 A1* | 11/2023 | Routt | G16Y 40/20 |

* cited by examiner

*Primary Examiner* — Amare F Tabor
(74) *Attorney, Agent, or Firm* — Moore & Van Allen PLLC; Anoohya Yarlagadda

(57) ABSTRACT

Embodiments of the present invention provide a system for mitigating dual domain vulnerabilities using fiber optic gyroscope and quantum cryptography. The system is configured for receiving an alert associated with misappropriation of an interaction processing device, via a quantum communication channel, in response to receiving the alert, extracting monitoring data associated with the interaction processing device from one or more monitoring devices, analyzing the alert received via the quantum communication channel and the monitoring data extracted from the one or more monitoring devices, determining unauthorized access of the interaction processing device based on analyzing the alert and the monitoring data, and performing one or more actions to mitigate vulnerabilities associated with the unauthorized access of the interaction processing device.

14 Claims, 8 Drawing Sheets

SYSTEM AND METHOD FOR MITIGATING DUAL DOMAIN VULNERABILITIES USING FIBER OPTIC GYROSCOPE AND QUANTUM CRYPTOGRAPHY

BACKGROUND

There exists a need for a system for mitigating dual domain vulnerabilities using fiber optic gyroscope and quantum cryptography.

BRIEF SUMMARY

Embodiments of the present invention address the above needs and/or achieve other advantages by providing apparatuses (e.g., a system, computer program product and/or other devices) and methods for mitigating dual domain vulnerabilities using fiber optic gyroscope and quantum cryptography. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention receives an alert associated with misappropriation of an interaction processing device, via a quantum communication channel, in response to receiving the alert, extracts monitoring data associated with the interaction processing device from one or more monitoring devices, analyzes the alert received via the quantum communication channel and the monitoring data extracted from the one or more monitoring devices, determines unauthorized access of the interaction processing device based on analyzing the alert and the monitoring data, and performs one or more actions to mitigate vulnerabilities associated with the unauthorized access of the interaction processing device.

In some embodiments, the present invention receives the alert from a gyroscope associated with the interaction processing device.

In some embodiments, the gyroscope is a fiber optic gyroscope.

In some embodiments, the gyroscope is a component of the interaction processing device.

In some embodiments, the gyroscope is an external device monitoring the interaction processing device.

In some embodiments, the present invention causes the gyroscope to continuously monitor the interaction processing device to detect the misappropriation of the interaction processing device by unauthorized users.

In some embodiments, the present invention causes a processor of the gyroscope to detect the misappropriation of the interaction processing device based on monitoring the interaction processing device, generate the alert, wherein the alert comprises information associated with the misappropriation of the interaction processing device, encrypt the alert using quantum cryptography, and transmit the encrypted alert to the system via the quantum communication channel.

In some embodiments, the interaction processing device is a user mobile device.

In some embodiments, the present invention causes the processor of the gyroscope to detect the misappropriation of the interaction processing device based on identifying an anomaly associated with usage of the user mobile device.

In some embodiments, the interaction processing device is an entity device.

In some embodiments, the present invention causes the processor of the gyroscope to detect the misappropriation of the interaction processing device based on identifying an anomaly associated with position or orientation of the entity device.

In some embodiments, the one or more monitoring devices comprise multiverse-enabled robotic cameras.

In some embodiments, the one or more actions comprise at least one of initiating automatic lockdown procedures associated the interaction processing devices, generating and transmitting notifications to one or more third party entities and one or more users via the quantum communication channel, causing the one or more monitoring devices to continuously record and transmit real-time recording data to the one or more third party entities, entity systems, and the one or more users, deploying one or more automated mechanisms to locations associated with the interaction processing devices, and performing data logging associated with the misappropriation on a distributed register.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
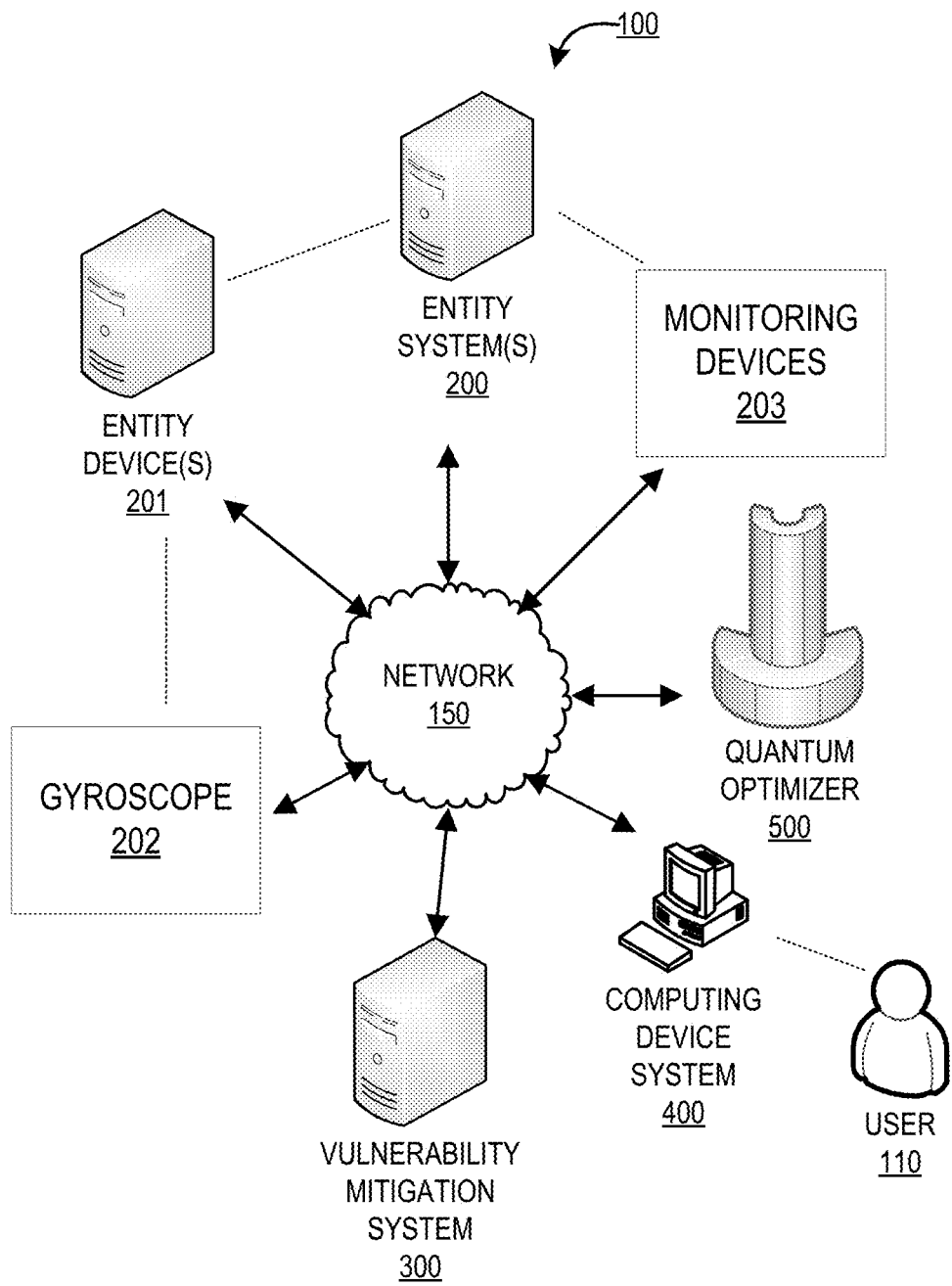
Figure 2:
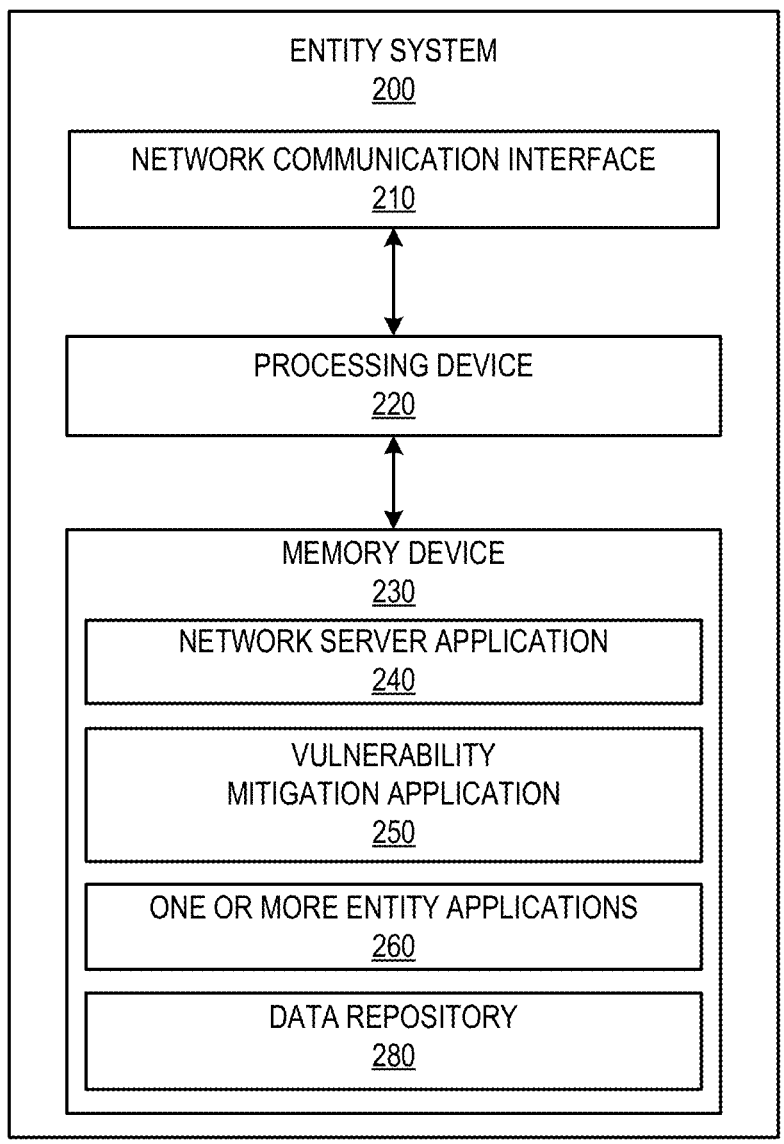
Figure 3:
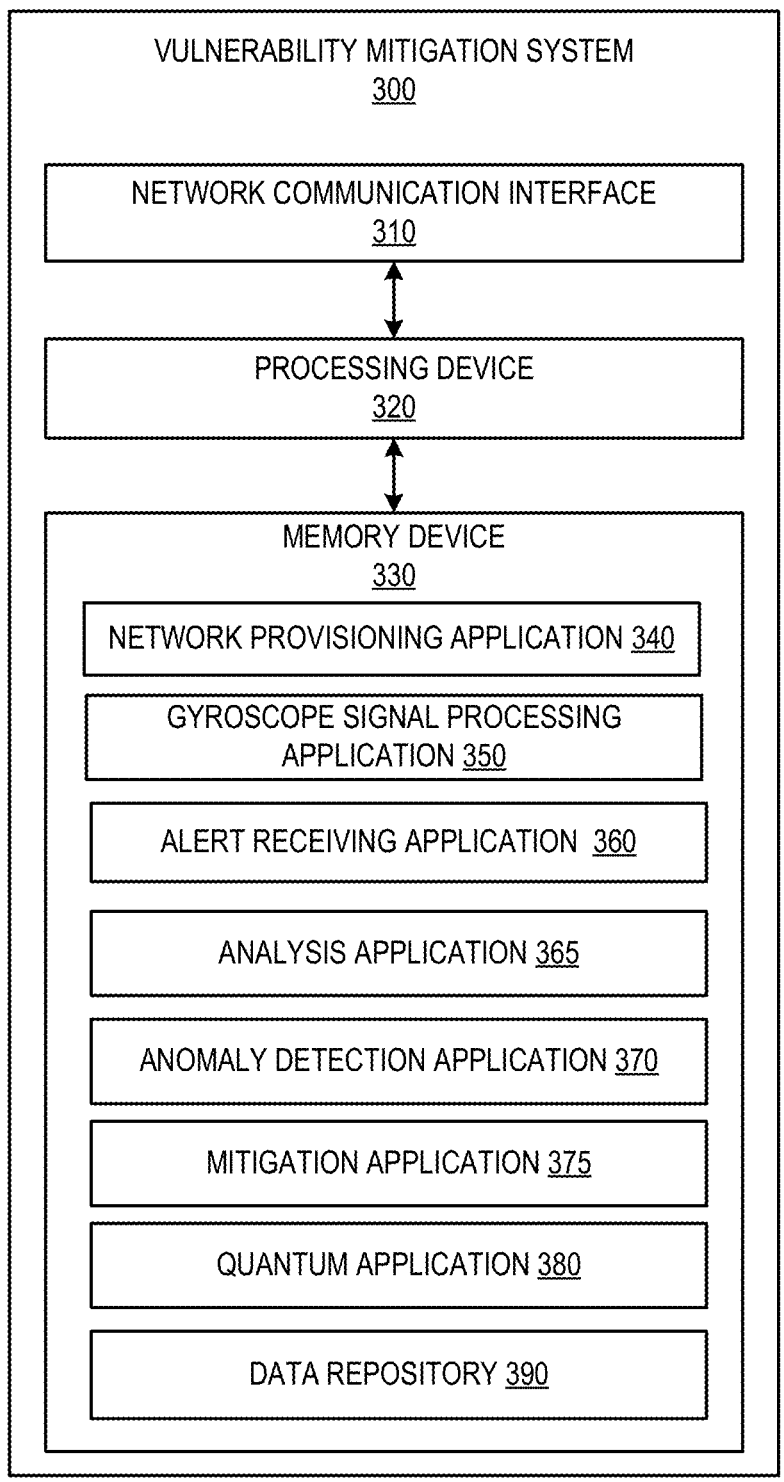
Figure 4:
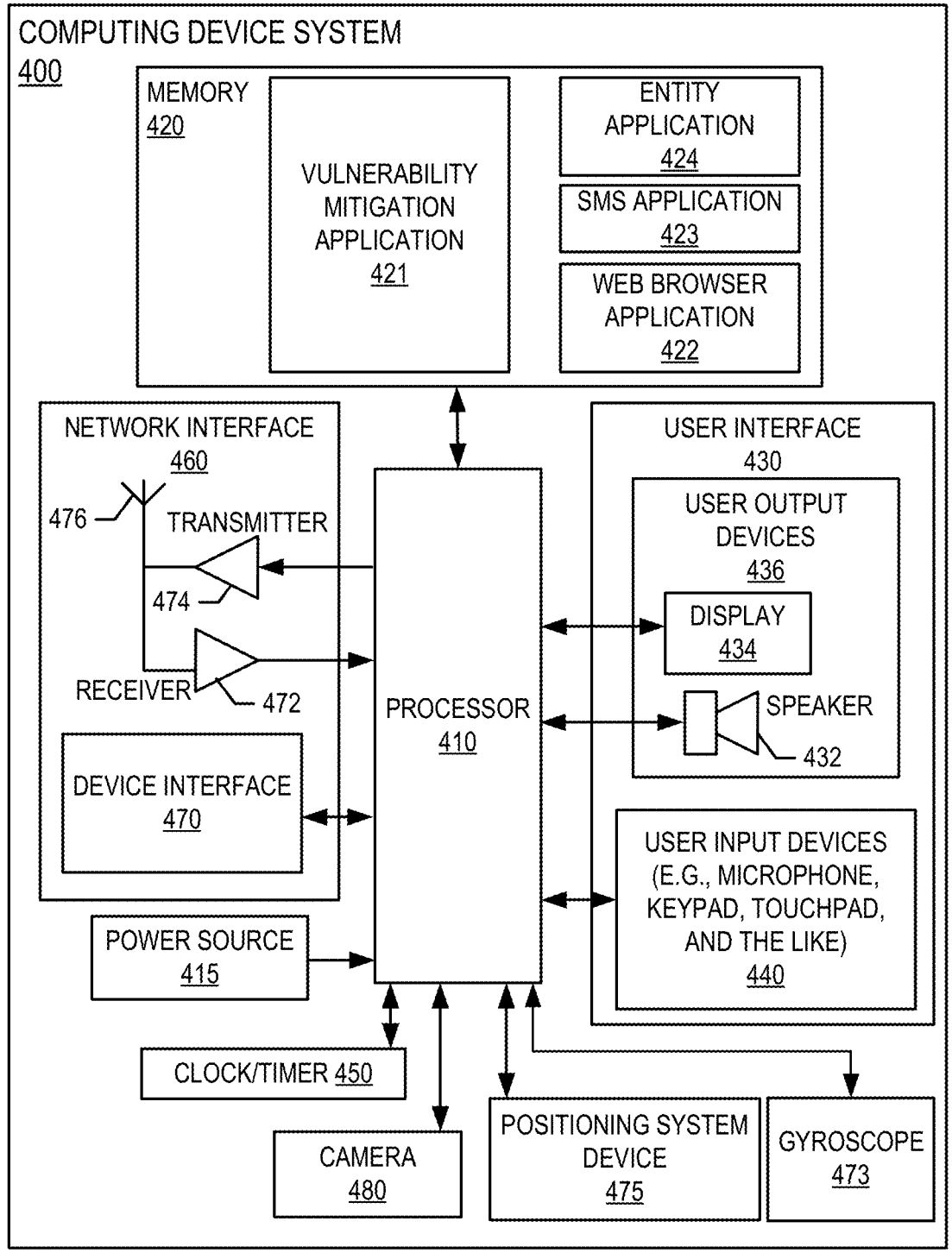
Figure 5:
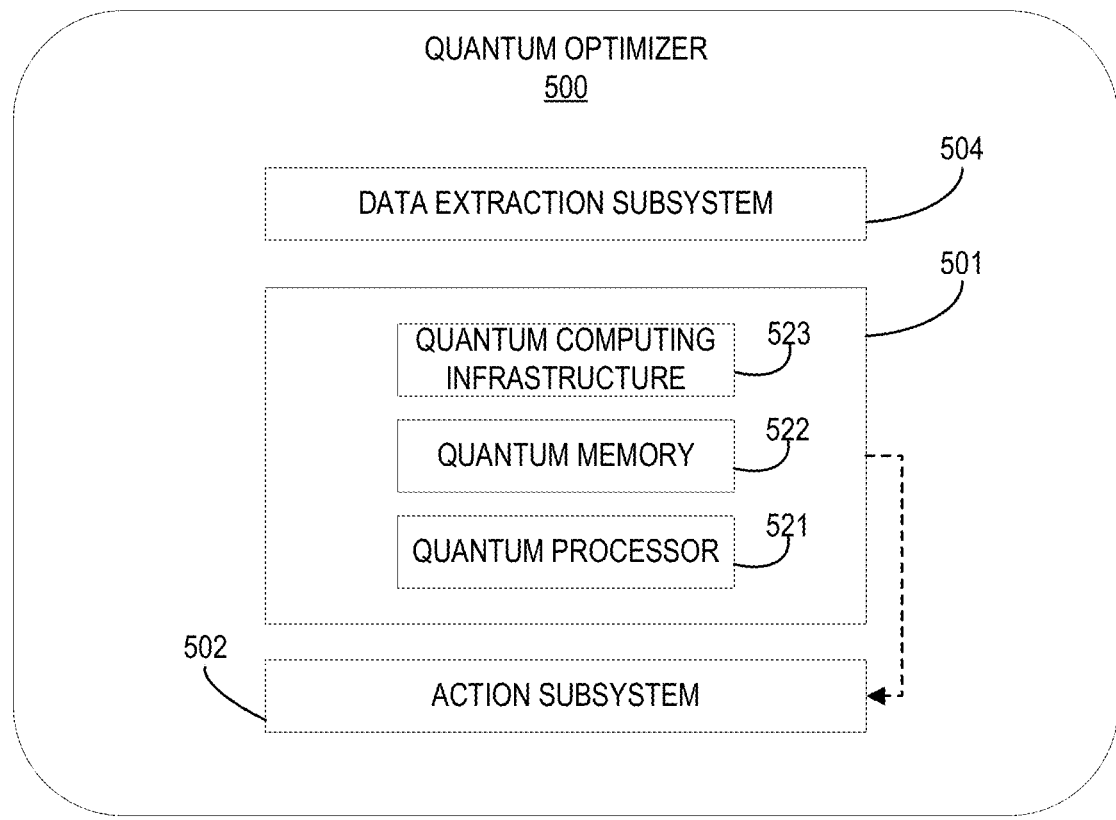
Figure 6A:
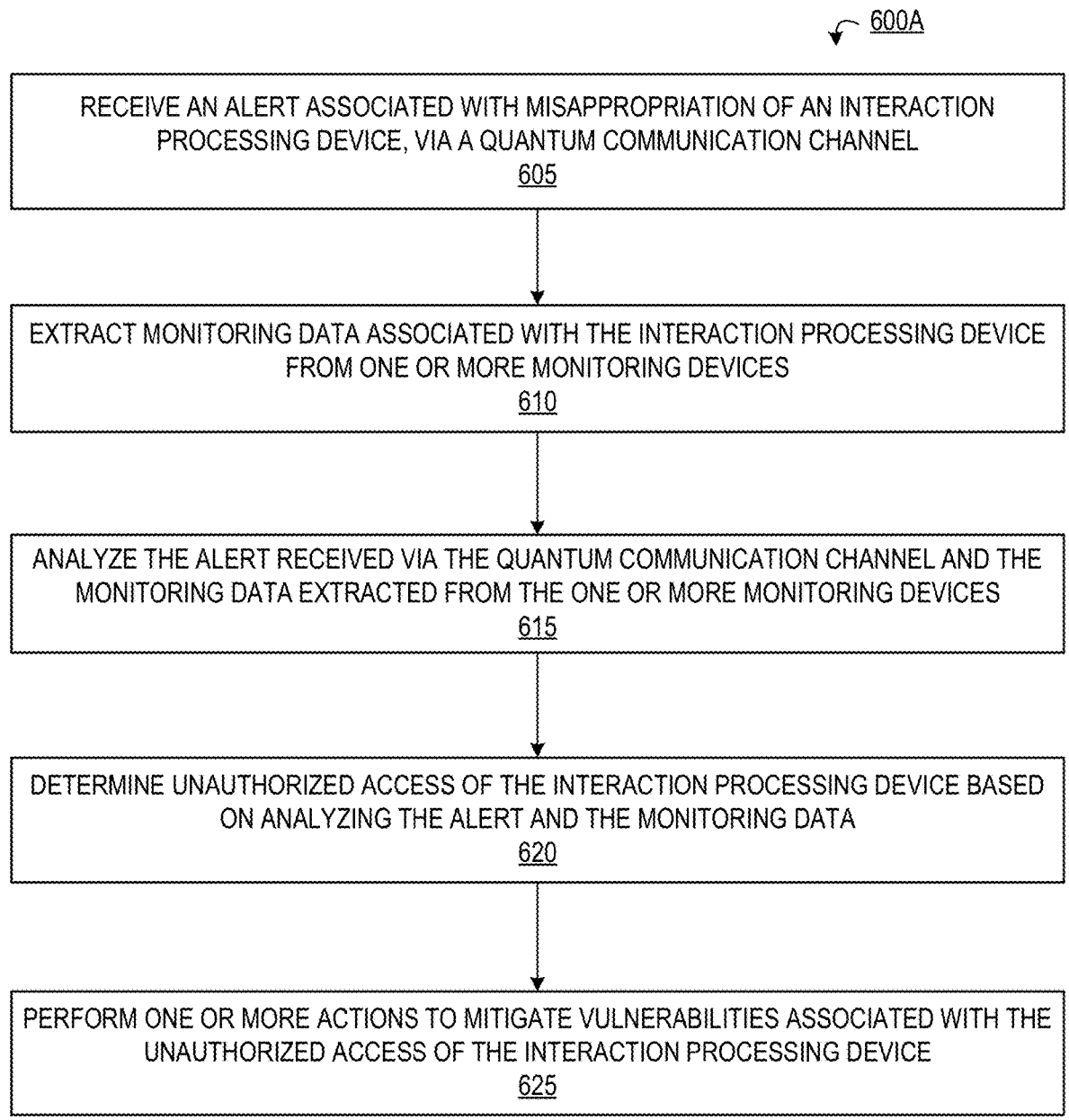
Figure 6B:
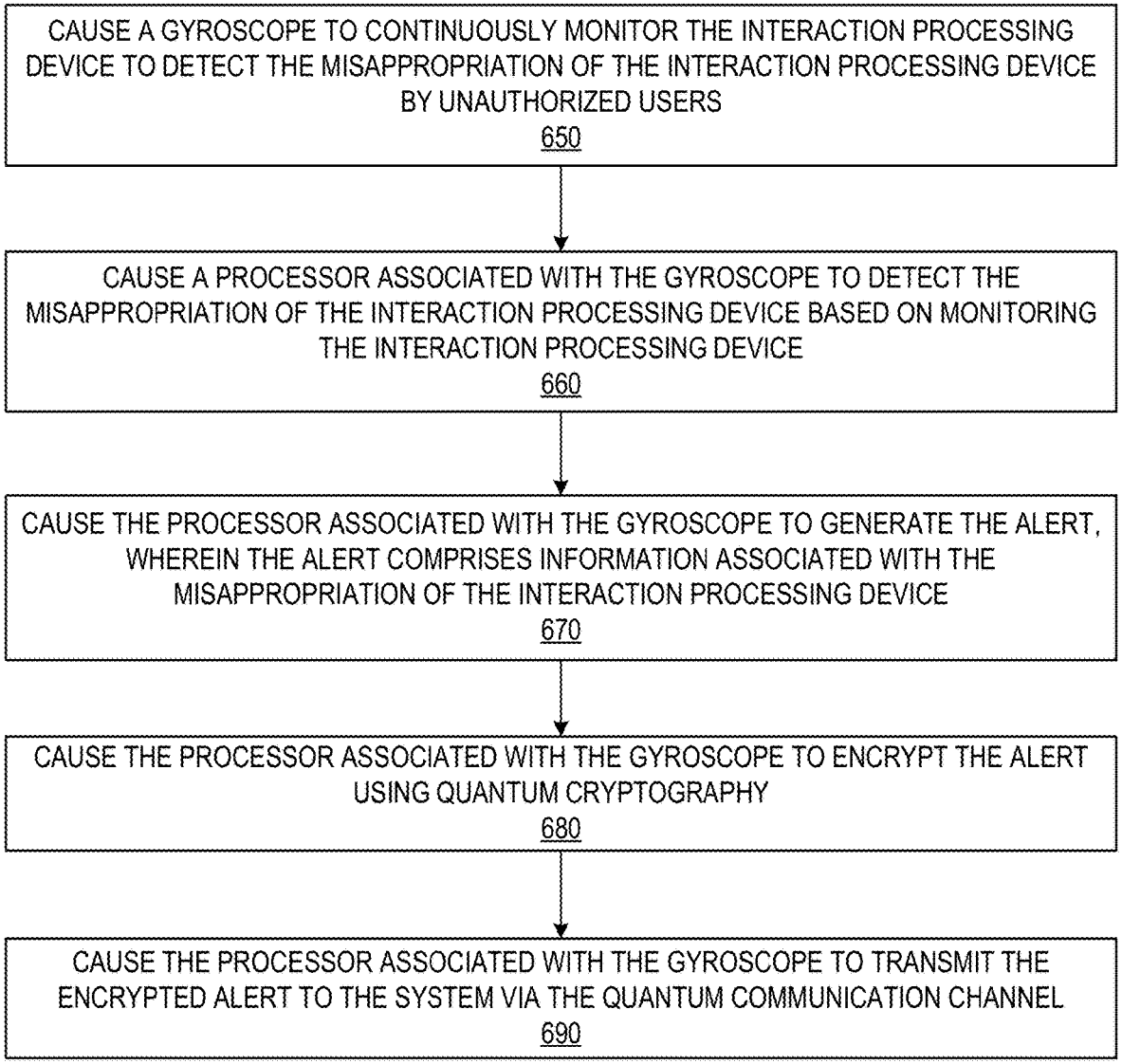
Figure 7:
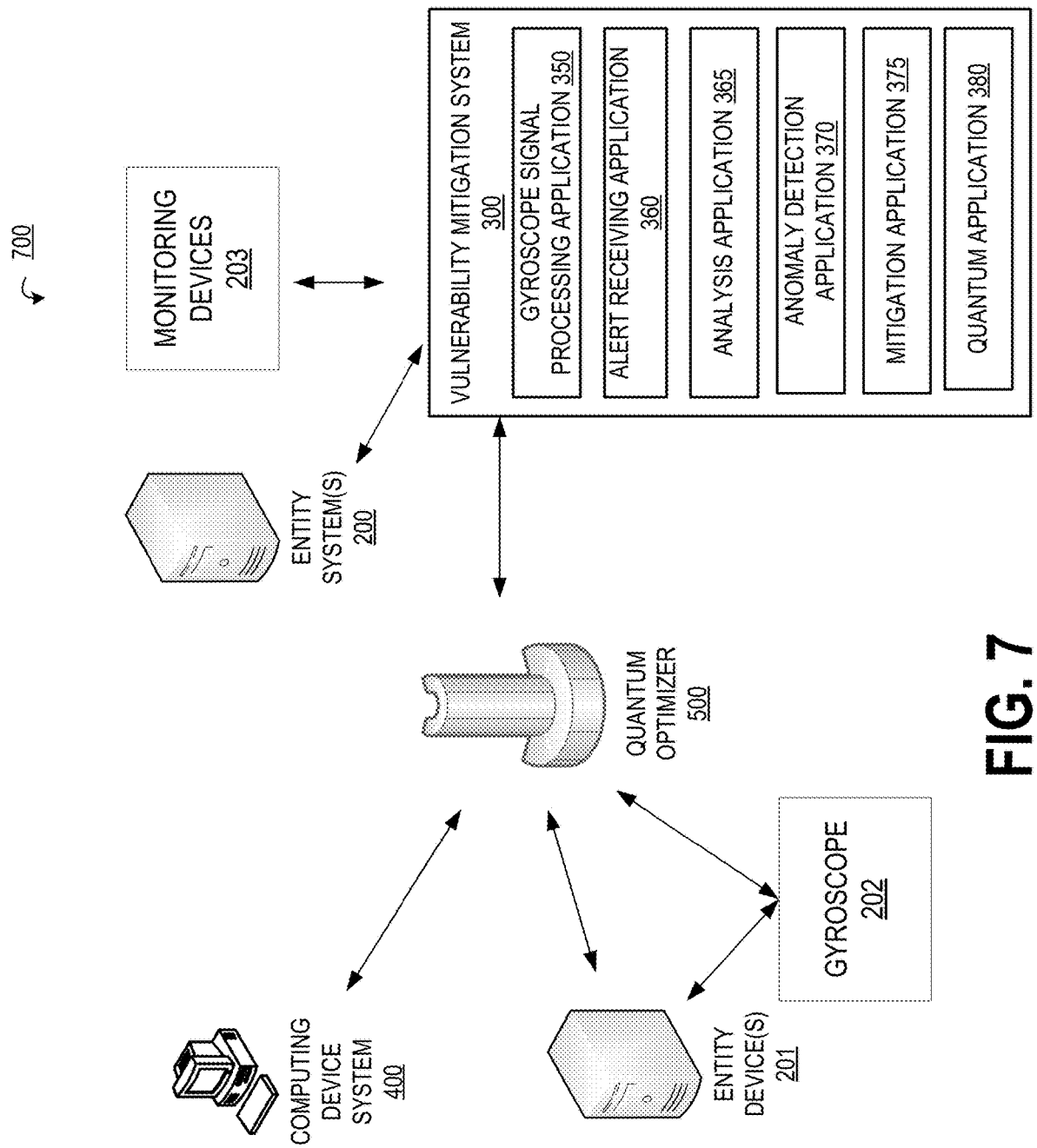

Having thus described embodiments of the invention in general terms, reference will now be made the accompanying drawings, wherein:

FIG. 1 provides a block diagram illustrating a system environment for mitigating dual domain vulnerabilities using fiber optic gyroscope and quantum cryptography, in accordance with an embodiment of the invention;

FIG. 2 provides a block diagram illustrating the entity system 200 of FIG. 1, in accordance with an embodiment of the invention;

FIG. 3 provides a block diagram illustrating a vulnerability mitigation system 300 of FIG. 1, in accordance with an embodiment of the invention;

FIG. 4 provides a block diagram illustrating the computing device system 400 of FIG. 1, in accordance with an embodiment of the invention;

FIG. 5 presents a block diagram illustrating a quantum optimizer of FIG. 1, in accordance with embodiments of the present invention;

FIG. 6A provides a process flow for mitigating dual domain vulnerabilities using fiber optic gyroscope and quantum cryptography, in accordance with an embodiment of the invention;

FIG. 6B provides a process flow for detecting and processing misappropriation of interaction processing devices via a gyroscope, in accordance with an embodiment of the invention; and FIG. 7 provides a block diagram illustrating the process flow of mitigating dual domain vulnerabilities using fiber optic gyroscope and quantum cryptography, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that uses one or more devices to interact with users to provide any information or to complete an action that is requested by the users. In some embodiments, the entity may be a financial institution which may include any financial institutions such as commercial banks, thrifts, federal and state savings banks, savings and loan associations, credit unions, investment companies, insurance companies and the like. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications, systems, servers, and/or devices provided by the entity and/or the system of the present invention. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, a quantum computer is any computer that utilizes the principles of quantum physics to perform computational operations. Several variations of quantum computer design are known, including photonic quantum computing, superconducting quantum computing, nuclear magnetic resonance quantum computing, and/or ion-trap quantum computing. Regardless of the particular type of quantum computer implementation, all quantum computers encode data onto qubits. Whereas classical computers encode bits into ones and zeros, quantum computers encode data by placing a qubit into one of two identifiable quantum states. Unlike conventional bits, however, qubits exhibit quantum behavior, allowing the quantum computer to process a vast number of calculations simultaneously.

A qubit can be formed by any two-state quantum mechanical system. For example, in some embodiments, a qubit may be the polarization of a single photon or the spin of an electron. Qubits are subject to quantum phenomena that cause them to behave much differently than classical bits. Quantum phenomena include superposition, entanglement, tunneling, superconductivity, and the like.

Two quantum phenomena are especially important to the behavior of qubits in a quantum computer: superposition and entanglement. Superposition refers to the ability of a quantum particle to be in multiple states at the same time. Entanglement refers to the correlation between two quantum particles that forces the particles to behave in the same way even if they are separated by great distances. Together, these two principles allow a quantum computer to process a vast number of calculations simultaneously.

In a quantum computer with n qubits, the quantum computer can be in a superposition of up to $2^n$ states simultaneously. By comparison, a classical computer can only be in one of the $2^n$ states at a single time. As such, a quantum computer can perform vastly more calculations in a given time period than its classical counterpart. For example, a quantum computer with two qubits can store the information of four classical bits. This is because the two qubits will be a superposition of all four possible combinations of two classical bits (00, 01, 10, or 11). Similarly, a three qubit system can store the information of eight classical bits, four qubits can store the information of sixteen classical bits, and so on. A quantum computer with three hundred qubits could possess the processing power equivalent to the number of atoms in the known universe.

Despite the seemingly limitless possibilities of quantum computers, present quantum computers are not yet substitutes for general purpose computers. Instead, quantum computers can outperform classical computers in a specialized set of computational problems. Principally, quantum computers have demonstrated superiority in solving optimization problems. Generally speaking, the term "optimization problem" as used throughout this application describe a problem of finding the best solution from a set of all feasible solutions. In accordance with some embodiments of the present invention, quantum computers as described herein are designed to perform adiabatic quantum computation and/or quantum annealing. Quantum computers designed to perform adiabatic quantum computation and/or quantum annealing are able to solve optimization problems as contemplated herein in real time or near real time.

Embodiments of the present invention make use of quantum ability of optimization by utilizing a quantum computer in conjunction with a classical computer. Such a configuration enables the present invention to take advantage of quantum speedup in solving optimization problems, while avoiding the drawbacks and difficulty of implementing quantum computing to perform non-optimization calculations. Examples of quantum computers that can be used to solve optimization problems parallel to a classic system are described in, for example, U.S. Pat. Nos. 9,400,499, 9,207,672, each of which is incorporated herein by reference in its entirety.

Security challenges are increasing day by day across digital domains (e.g., online platforms, virtual world, augmented reality world, and/or the like) and physical domains (e.g., physical entity locations) associated with entities. Traditional methods are currently inadequate to handle evolving security challenges across dual domains (i.e., digital and physical). As such, there exists a need for a system to mitigate dual domain vulnerabilities. The system of the present invention solves this problem as explained in detail below.

FIG. 1 provides a block diagram illustrating a system environment 100 for mitigating dual domain vulnerabilities using fiber optic gyroscope and quantum cryptography, in accordance with an embodiment of the invention. As illustrated in FIG. 1, the environment 100 includes a vulnerability mitigation system 300 interacting with a quantum optimizer 500, entity system 200, entity devices 201, a gyroscope 202, monitoring devices 203, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees of an entity associated with the entity system 200 (e.g., software engineer, application developer, application tester, financial analyst, marketing specialist, human resources specialist, and/or the like). In some embodiments, the one or more user(s) 110 of the system environment 100 may further comprise end-users which may include, but are not limited to, customers, potential customers, or the like of the entity associated with the entity system 200.

The entity system(s) 200 may be any system owned or otherwise controlled by an entity to support or perform one or more process steps described herein. In some embodiments, the entity may be any organization that interacts with customers using interaction devices (e.g., entity devices 201, computing device system 400) to perform one or more actions to complete one or more interactions initiated by the users 110. In some embodiments, the entity is a financial institution. In some such embodiments, the one or more interactions may be resource interactions (e.g., transactions) associated with resource pools (e.g., accounts) associated with the user, where the resource pools may or may not be maintained, managed, and/or the like by the entity. In some embodiments, the entity is a non-financial institution. In some such embodiments, the one or more interactions may be request of information by the user via the entity device 201 and/or computing device system 400. In some embodiments, the entity devices 201 may be any devices associated with the entity. In some embodiments, where the entity is a financial institution, the entity devices 201 may comprise automated teller machines, computing devices, servers, data centers, and/or any other devices that may be associated with the entity. In some embodiments, the gyroscope 202 may be a device used for measuring orientation associated with the entity devices 201 and/or the entity systems 200. In some embodiments, the gyroscope 202 may comprise a processor configured to perform one or more operations based on instructions received from the vulnerability mitigation system 300. In some embodiments, the processor may or may not be physically linked with the gyroscope 202. In some embodiments, the processor may or may not be an internal component of the gyroscope 202. In some embodiments, the gyroscope 202 used herein may be a fiber optic gyroscope. In some embodiments, there may be a gyroscope for each of the entity devices 201 and/or the entity systems 200. In some embodiments, the gyroscope 202 may be an internal component of the entity devices 201. In some embodiments, the gyroscope 202 may be an external component to the entity devices 201 and the entity systems 200, where the external component may or may not be physically linked with the entity devices 201 and the entity systems 200. In some embodiments, the gyroscope 202 may be a standalone device used to monitor the entity devices 201 and the entity systems 200, where the gyroscope 202 may communicate directly with other components of the environment 100. In some embodiments, the monitoring devices 203 may be any image, audio, and/or video capturing and/or recording devices. In some embodiments, the monitoring devices 203 may be multiverse-enabled robotic cameras (e.g., multiverse-enabled Pan-Tilt-Zoom (PTZ) cameras). In some embodiments, the monitoring devices 203 may be located at entity locations to monitor the entity devices 201 and/or the entity systems 200.

The vulnerability mitigation system 300 is a system of the present invention for performing one or more process steps described herein. In some embodiments, the vulnerability mitigation system 300 may be an independent system. In some embodiments, the vulnerability mitigation system 300 may be a part of the entity system 200. As further illustrated in FIG. 1, an exemplary quantum optimizer 500 that can be used in parallel with the vulnerability mitigation system 300 to solve optimization problems is presented. Each of the systems and devices of the environment 100 may communicate with the quantum optimizer 500 to encrypt or decrypt communications using quantum cryptography for transmissions. In some embodiments, some, more, or all of the communications described herein may take place through the quantum communication channel.

The vulnerability mitigation system 300, the quantum optimizer 500, the entity system 200, the entity devices 201, the gyroscope 202, the monitoring devices 203, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the vulnerability mitigation system 300 is configured to communicate information or instructions with the entity system 200, the entity devices 201, the gyroscope 202, the monitoring devices 203, the quantum optimizer 500, and/or the computing device system 400 across the network 150. In some embodiments, the entity systems 200, the entity devices 201, the gyroscope 202, and the monitoring devices 203 may receive instructions from the vulnerability mitigation system 300 to perform one or more operations as described herein.

The computing device system 400 may be a computing device of the user 110. In general, the computing device system 400 communicates with the user 110 via a user interface of the computing device system 400, and in turn is configured to communicate information or instructions with the vulnerability mitigation system 300, entity devices 201, and/or entity system 200 across the network 150.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by an entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a network server application 240, a vulnerability mitigation application 250, one or more entity applications 260, and a data repository 280. The computer-executable program code of the network server application 240, the vulnerability mitigation application 250, and the one or more entity applications 260 to perform certain logic, data-extraction, and data-storing functions of the entity system 200 described herein, as well as communication functions of the entity system 200.

The network server application 240, the vulnerability mitigation application 250, and the one or more entity applications 260 are configured to store data in the data repository 280 or to use the data stored in the data repository 280 when communicating through the network communication interface 210 with the vulnerability mitigation system 300, and the computing device system 400 to perform one or more process steps described herein. In some embodiments, the entity system 200 may receive instructions from the vulnerability mitigation system 300 via the vulnerability mitigation application 250 to perform certain operations. The vulnerability mitigation application 250 may be provided by the vulnerability mitigation system 300.

FIG. 3 provides a block diagram illustrating the vulnerability mitigation system 300 in greater detail, in accordance with embodiments of the invention. As illustrated in FIG. 3, in one embodiment of the invention, the vulnerability mitigation system 300 includes one or more processing devices 320 operatively coupled to a network communication interface 310 and a memory device 330. In certain embodiments, the vulnerability mitigation system 300 is operated by an entity, such as a financial institution, while in other embodiments, the vulnerability mitigation system 300 is operated by an entity other than a financial institution. In some embodiments, the vulnerability mitigation system 300 is owned or operated by the entity of the entity system 200. In some embodiments, the vulnerability mitigation system 300 may be an independent system. In alternate embodiments, the vulnerability mitigation system 300 may be a part of the entity system 200.

It should be understood that the memory device 330 may include one or more databases or other data structures/repositories. The memory device 330 also includes computer-executable program code that instructs the processing device 320 to perform data processing operations of the vulnerability mitigation system 300 and also to operate the network communication interface 310 to perform certain communication functions of the vulnerability mitigation system 300 described herein. For example, in one embodiment of the vulnerability mitigation system 300, the memory device 330 includes, but is not limited to, a network provisioning application 340, a gyroscope signal processing application 350, an alert receiving application 360, an analysis application 365, an anomaly detection application 370, a mitigation application 375, a quantum application 380, and a data repository 390 comprising data processed or accessed by one or more applications in the memory device 330. The computer-executable program code of the network provisioning application 340, the gyroscope signal processing application 350, the alert receiving application 360, the analysis application 365, the anomaly detection application 370, the mitigation application 375, and the quantum application 380 may instruct the processing device 320 to perform certain logic, data-processing, and data-storing functions of the vulnerability mitigation system 300 described herein, as well as communication functions of the vulnerability mitigation system 300. In some embodiments, each of the applications in the memory device 330 may communicate with the quantum optimizer 500 via the quantum application 380 to transmit data to the quantum optimizer, cause the quantum optimizer 500 to perform one or more computations associated with the process described herein, and receive computed data back from the quantum optimizer 500.

The network provisioning application 340, the gyroscope signal processing application 350, the alert receiving application 360, the analysis application 365, the anomaly detection application 370, the mitigation application 375, and the quantum application 380 are configured to invoke or use the data in the data repository 390 when communicating through the network communication interface 310 with the entity system 200, and the computing device system 400. In some embodiments, the network provisioning application 340, the gyroscope signal processing application 350, the alert receiving application 360, the analysis application 365, the anomaly detection application 370, the mitigation application 375, and the quantum application 380 may store the data extracted or received from the entity system 200 and the computing device system 400 in the data repository 390. In some embodiments, the network provisioning application 340, the gyroscope signal processing application 350, the alert receiving application 360, the analysis application 365, the anomaly detection application 370, the mitigation application 375, and the quantum application 380 may be a part of a single application. One or more processes performed by the network provisioning application 340, the gyroscope signal processing application 350, the alert receiving application 360, the analysis application 365, the anomaly detection application 370, the mitigation application 375, and the quantum application 380 are described in detail below.

FIG. 4 provides a block diagram illustrating a computing device system 400 of FIG. 1 in more detail, in accordance with embodiments of the invention. However, it should be understood that the computing device system 400 is merely illustrative of one type of computing device system that may benefit from, employ, or otherwise be involved with embodiments of the present invention and, therefore, should not be taken to limit the scope of embodiments of the present invention. The computing devices may include any one of portable digital assistants (PDAs), pagers, mobile televisions, mobile phone, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, a positioning system device 475, and a gyroscope 473. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 150. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like. For example, the computing device system 400 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with LTE protocols, with 4GPP protocols and/or the like. The computing device system 400 may also be configured to operate in accordance with non-cellular communication mechanisms, such as via a wireless local area network (WLAN) or other communication/data networks.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110 may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 includes a gyroscope 473 which may be used to at least measure orientation of the computing device system 400. In some embodiments, the processor 410 may receive instructions (e.g., executable instructions or non-executable instructions) from the vulnerability mitigation system 300 to control and/or operate the gyroscope 473. In some embodiments, the processor 410 may further receive instructions from the vulnerability mitigation system 300 to perform processing operations associated with data collected, measured, and/or the like by the gyroscope 473.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a vulnerability mitigation application 421, an entity application 424, or the like. These applications also typically instructions to a graphical user interface (GUI) on the display 430 that allows the user 110 to interact with the entity system 200, the vulnerability mitigation system 300, and/or other devices or systems. The memory 420 of the computing device system 400 may comprise a Short Message Service (SMS) application 423 configured to send, receive, and store data, information, communications, alerts, and the like via the wireless network 150.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 is a schematic diagram of an exemplary Quantum Optimizer 500 that can be used in parallel with a classical computer to solve optimization problems. The Quantum Optimizer 500 is comprised of a Data Extraction Subsystem 504, a Quantum Computing Subsystem 501, and an Action Subsystem 505. As used herein, the term "subsystem" generally refers to components, modules, hardware, software, communication links, and the like of particular components of the system. Subsystems as contemplated in embodiments of the present invention are configured to perform tasks within the system as a whole.

As depicted in FIG. 5, the Data Extraction Subsystem 504 communicates with the vulnerability mitigation system 300 to extract data for optimization. It will be understood that any method of communication between the Data Extraction Subsystem 504 and the network includes, but is not limited to wired communication, Radiofrequency (RF) communication, Bluetooth®, WiFi, and the like. The Data Extraction Subsystem 504 then formats the data for optimization in the Quantum Computing Subsystem.

As further depicted in FIG. 5, the Quantum Computing Subsystem 501 comprises a Quantum Computing Infrastructure 523, a Quantum Memory 522, and a Quantum Processor 521. The Quantum Computing Infrastructure 523 comprises physical components for housing the Quantum Processor 521 and the Quantum Memory 522. The Quantum Computer Infrastructure 523 further comprises a cryogenic refrigeration system to keep the Quantum Computing Subsystem 501 at the desired operating conditions. In general, the Quantum Processor 521 is designed to perform adiabatic quantum computation and/or quantum annealing to optimize data received from the Data Extraction Subsystem 504. The Quantum Memory 522 is comprised of a plurality of qubits used for storing data during operation of the Quantum Computing Subsystem 501. In general, qubits are any two-state quantum mechanical system. It will be understood that the Quantum Memory 522 may be comprised of any such two-state quantum mechanical system, such as the polarization of a single photon, the spin of an electron, and the like.

The Action Subsystem 502 communicates the optimized data from the Quantum Computing Subsystem 501 back to the exposure analysis system. It will be understood that any method of communication between the Data Extraction Subsystem 504 and the network includes, but is not limited to wired communication, Radiofrequency (RF) communication, Bluetooth®, WiFi, and the like.

In accordance with the present systems and methods, an on-board quantum optimizer may be employed to perform real-time optimizations to perform computations more quickly and more reliably than a digital computing system. Because a quantum computing device inherently performs optimization in its natural evolution, quantum optimizer is particularly well-suited to solve optimization problems.

FIG. 6A provides a process flow for mitigating dual domain vulnerabilities using fiber optic gyroscope and quantum cryptography, in accordance with an embodiment of the invention. As shown in block 605, the system receives an alert associated with misappropriation of an interaction processing device, via a quantum communication channel. The interaction processing device may be an entity device associated with an entity or a computing device system associated with a user. In some embodiments, the alert may be received from a gyroscope associated with the interaction processing device. The process flow associated with detection of the misappropriation using a gyroscope is explained in detail in FIG. 6B.

As shown in block 610, the system extracts monitoring data associated with the interaction processing device from one or more monitoring devices. In response to receiving the alert, the system communicates with the one or more monitoring devices to extract monitoring data from timestamp associated with the detection of the misappropriation of the interaction processing device. In some embodiments, the one or more monitoring devices may be any image, audio, and/or visual capturing or recording devices. In some embodiments, the one or more monitoring devices are robotic cameras. In some exemplary embodiments, the one or more monitoring devices are multiverse-enabled Pan-Tilt-Zoom (PTZ) cameras. The multiverse-enabled PTZ cameras can dynamically shift their perspectives across different dimensions providing comprehensive coverage to capture events from various angles simultaneously. The capabilities of multiverse-enabled Pan-Tilt-Zoom (PTZ) cameras in different multiverse dimensions may comprise capturing spatial dimensions, temporal dimensions, contextual dimensions, and spectral dimensions. Capturing the spatial dimensions may comprise capturing horizontal movements and vertical movements by adjusting focal length to magnify or reduce the view. Capturing the temporal dimensions may comprise capturing events from a historical perspective, capturing real-time events, and predictively capturing potential future events. Capturing contextual dimensions may comprise capturing events in the physical space and monitoring events in digital and/or cyber realm. Capturing spectral dimensions may comprise capturing visible light spectrum, infrared spectrum for low light scenarios, and ultraviolet spectrum for specialized monitoring.

As shown in block 615, the system analyzes the alert received via the quantum communication channel and the monitoring data extracted from the one or more monitoring devices. As shown in block 620, the system determines unauthorized access of the interaction processing device based on analyzing the alert and the monitoring data. For example, the system may analyze the alert and the monitoring data to determine that an automated teller machine has been tampered.

As shown in block 625, the system performs one or more actions to mitigate vulnerabilities associated with the unauthorized access of the interaction processing device. The one or more actions may comprise at least one of initiating automatic lockdown procedures associated the interaction processing devices, generating and transmitting notifications to one or more third party entities and one or more users via the quantum communication channel, causing the one or more monitoring devices to continuously record and transmit real-time recording data to the one or more third party entities, entity systems, and the one or more users, deploying one or more automated mechanisms to locations associated with the interaction processing devices, and performing data logging associated with the misappropriation on a distributed register.

FIG. 6B provides a process flow for detecting and processing misappropriation of interaction processing devices via a gyroscope, in accordance with an embodiment of the invention. As shown in block 650, the system causes a gyroscope to continuously monitor the interaction processing device to detect the misappropriation of the interaction processing device by unauthorized users. In some embodiments, the gyroscope is a fiber optic gyroscope. In some embodiments, the gyroscope is a component of the interaction processing device. In some embodiments, the gyroscope is an external device monitoring the interaction processing device. In some embodiments, the system may cause the gyroscope to continuously monitor the interaction processing device to detect the misappropriation of the interaction processing device by unauthorized users. The gyroscope used herein may operate based on the principle of Sagnac effect, where two light beams travel in opposite directions around a closed-loop when recombined will exhibit an interference pattern and if the loop is rotating, the interference pattern shifts. The operation of the fiber optic gyroscope used herein comprises splitting a beam of light into two, where each beam travels in opposite directions around a closed-loop path (usually triangular or rectangular) and if the loop remains stationary, both light beams will complete their paths in the same amount of time, and their interference pattern remains constant, however, if the loop experiences any rotation or movement, one beam will take slightly more or less time to complete its path compared to the other beam due to the rotation/movement, thereby causing a shift in the interference pattern, which can be electronically detected. As such, when an unauthorized user tries to access the interaction processing device, the handling of the interaction processing device by the unauthorized user will introduce vibrations, movements, tilts, or the like which in turn lead to shifted interference patterns, thereby allowing the processor associated with the fiber optic gyroscope to detect misappropriation of the interaction processing device. In an embodiment where the interaction processing device is a user mobile device, the system may determine anomalies in usage of the user mobile device. In some embodiments, determining anomalies in the usage of the user mobile device may comprise detecting anomalies in behavioral biometrics (e.g., how an authorized users hold the device, tilt their device, movement of the device, typing speed, keystrokes, touchscreen gestures, or the like). In an embodiment where the interaction processing device is an entity device or an entity property (e.g., bank vaults, security lockers, or the like), the system may determine anomalies in position, orientation, location, geolocation, and/or the like of the entity device.

As shown in block 660, the system causes a processor associated with the gyroscope to detect the misappropriation of the interaction processing device based on monitoring the interaction processing device. The processor of the gyroscope may detect change in the interference patterns and may detect that the interaction processing device has been accessed by an unauthorized user.

As shown in block 670, the system causes the processor associated with the gyroscope to generate the alert, wherein the alert comprises information associated with the misappropriation of the interaction processing device. As shown in block 680, the system causes the processor associated with the gyroscope to encrypt the alert using quantum cryptography. In some embodiments, the system may cause the processor to encrypt the alert by communicating with the quantum optimizer 500 and/or utilizing quantum keys generated and transmitted using quantum key distribution protocol.

As shown in block 690, the system causes the processor associated with the gyroscope to transmit the encrypted alert to the system via the quantum communication channel. Upon receiving the encrypted alert via the quantum communication channel, the system may decrypt the encrypted alert by communicating with the quantum optimizer and/or utilizing quantum keys generated and transmitted using quantum key distribution protocol.

FIG. 7 provides a block diagram illustrating the process flow of mitigating dual domain vulnerabilities using fiber optic gyroscope and quantum cryptography, in accordance with an embodiment of the invention. As shown, the gyroscope 202 associated with the entity device 201 and/or the gyroscope 473 associated with the computing device system 400 may identify any misappropriations and may generate and transmit an encrypted alert to the vulnerability mitigation system 300 via a quantum communication channel facilitated by the quantum optimizer 500. The instructions associated with detection of misappropriation and generation and transmission of alerts may be provided by the gyroscope signal processing application 350 of the vulnerability mitigation system 300 to the entity devices 201 and the computing device systems 400. The alert receiving application 360 may receive the encrypted alert and may decrypt the alert via the quantum optimizer 500 and/or the quantum application 380. The analysis application 365 may extract monitoring data associated with the alert from the monitoring devices 203 and may analyze the monitoring data and the alert. Upon completion of the analysis, the analysis application 365 may provide the results of the analysis to the anomaly detection application 370, where the anomaly detection application 370 detects if the entity devices 201 or the computing device systems 400 have been accessed or tampered by unauthorized users. Upon detection of unauthorized access by the anomaly detection application 370, the mitigation application 375 initiates one or more actions to mitigate vulnerabilities associated with the unauthorized access by communicating with the entity systems 200.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for mitigating dual domain vulnerabilities using fiber optic gyroscope and quantum cryptography, comprising: at least one processing device; at least one memory device; and a module stored in the at least one memory device comprising executable instructions that when executed by the at least one processing device, cause the at least one processing device to:
   receive an alert associated with misappropriation of an interaction processing device, via a quantum communication channel;
   in response to receiving the alert, extract monitoring data associated with the interaction processing device from one or more monitoring devices;
   analyze the alert received via the quantum communication channel and the monitoring data extracted from the one or more monitoring devices;
   determine unauthorized access of the interaction processing device based on analyzing the alert and the monitoring data; and perform one or more actions to mitigate vulnerabilities associated with the unauthorized access of the interaction processing device;
   wherein the executable instructions cause the at least one processing device to:
   receive the alert from a gyroscope associated with the interaction processing device;
   cause the gyroscope to continuously monitor the interaction processing device to detect the misappropriation of the interaction processing device by unauthorized users; and cause a processor of the gyroscope to: detect the misappropriation of the interaction processing device based on monitoring the interaction processing device; generate the alert, wherein the alert comprises information associated with the misappropriation of the interaction processing device; encrypt the alert using quantum cryptography; and transmit the encrypted alert to the system via the quantum communication channel.

2. The system according to claim 1, wherein the gyroscope is a fiber optic gyroscope.

3. The system according to claim 1, wherein the gyroscope is a component of the interaction processing device.

4. The system according to claim 1, wherein the gyroscope is an external device monitoring the interaction processing device.

5. The system according to claim 1, wherein the interaction processing device is a user mobile device.

6. The system according to claim 5, wherein the executable instructions cause the at least one processing device to cause the processor of the gyroscope to detect the misappropriation of the interaction processing device based on identifying an anomaly associated with usage of the user mobile device.

7. The system according to claim 1, wherein the interaction processing device is an entity device.

8. The system according to claim 7, wherein the executable instructions cause the at least one processing device to cause the processor of the gyroscope to detect the misappropriation of the interaction processing device based on identifying an anomaly associated with position or orientation of the entity device.

9. The system according to claim 1, wherein the one or more monitoring devices comprise multiverse-enabled robotic cameras.

10. The system according to claim 1, wherein the one or more actions comprise at least one of: initiating automatic lockdown procedures associated the interaction processing devices; generating and transmitting notifications to one or more third party entities and one or more users via the quantum communication channel; causing the one or more monitoring devices to continuously record and transmit real-time recording data to the one or more third party entities, entity systems, and the one or more users; deploying one or more automated mechanisms to locations associated with the interaction processing devices; and performing data logging associated with the misappropriation on a distributed register.

11. A computer program product for mitigating dual domain vulnerabilities using fiber optic gyroscope and quantum cryptography, comprising a non-transitory computer-readable storage medium having computer-executable instructions for:
receiving an alert associated with misappropriation of an interaction processing device, via a quantum communication channel;
in response to receiving the alert, extracting monitoring data associated with the interaction processing device from one or more monitoring devices;
analyzing the alert received via the quantum communication channel and the monitoring data extracted from the one or more monitoring devices;
determining unauthorized access of the interaction processing device based on analyzing the alert and the monitoring data; and
performing one or more actions to mitigate vulnerabilities associated with the unauthorized access of the interaction processing device;
wherein the executable instructions cause the at least one processing device to:
receive the alert from a gyroscope associated with the interaction processing device;
cause the gyroscope to continuously monitor the interaction processing device to detect the misappropriation of the interaction processing device by unauthorized users; and
cause a processor of the gyroscope to: detect the misappropriation of the interaction processing device based on monitoring the interaction processing device; generate the alert, wherein the alert comprises information associated with the misappropriation of the interaction processing device; encrypt the alert using quantum cryptography; and transmit the encrypted alert to the system via the quantum communication channel.

12. The computer program product according to claim 11, wherein the one or more actions comprise at least one of: initiating automatic lockdown procedures associated the interaction processing devices; generating and transmitting notifications to one or more third party entities and one or more users via the quantum communication channel; causing the one or more monitoring devices to continuously record and transmit real-time recording data to the one or more third party entities, entity systems, and the one or more users; deploying one or more automated mechanisms to locations associated with the interaction processing devices; and performing data logging associated with the misappropriation on a distributed register.

13. A computerized method for mitigating dual domain vulnerabilities using fiber optic gyroscope and quantum cryptography, the method comprising:
receiving an alert associated with misappropriation of an interaction processing device, via a quantum communication channel;
in response to receiving the alert, extracting monitoring data associated with the interaction processing device from one or more monitoring devices;
analyzing the alert received via the quantum communication channel and the monitoring data extracted from the one or more monitoring devices;
determining unauthorized access of the interaction processing device based on analyzing the alert and the monitoring data; and
performing one or more actions to mitigate vulnerabilities associated with the unauthorized access of the interaction processing device;
wherein the executable instructions cause the at least one processing device to:
receive the alert from a gyroscope associated with the interaction processing device;
cause the gyroscope to continuously monitor the interaction processing device to detect the misappropriation of the interaction processing device by unauthorized users; and
cause a processor of the gyroscope to: detect the misappropriation of the interaction processing device based on monitoring the interaction processing device; generate the alert, wherein the alert comprises information associated with the misappropriation of the interaction processing device; encrypt the alert using quantum cryptography; and transmit the encrypted alert to the system via the quantum communication channel.

14. The computerized method according to claim 13, wherein the one or more actions comprise at least one of: initiating automatic lockdown procedures associated the interaction processing devices; generating and transmitting notifications to one or more third party entities and one or more users via the quantum communication channel; causing the one or more monitoring devices to continuously record and transmit real-time recording data to the one or more third party entities, entity systems, and the one or more users; deploying one or more automated mechanisms to locations associated with the interaction processing devices; and performing data logging associated with the misappropriation on a distributed register.

\* \* \* \* \*